United States Patent
Cunico et al.

(10) Patent No.: US 9,753,927 B2
(45) Date of Patent: *Sep. 5, 2017

(54) ELECTRONIC MEETING QUESTION MANAGEMENT

(71) Applicant: International Business Machines Corporation, Armonk, NY (US)

(72) Inventors: Hernan A. Cunico, Holly Springs, NC (US); Jonathan Dunne, Dungarvan (IE); Jeremiah O'Connor, Roscommon Town (IE); Asima Silva, Holden, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/086,927

(22) Filed: Mar. 31, 2016

(65) Prior Publication Data

US 2016/0239537 A1   Aug. 18, 2016

Related U.S. Application Data

(63) Continuation of application No. 14/623,855, filed on Feb. 17, 2015.

(51) Int. Cl.
   *G06F 17/30* (2006.01)
   *G09B 7/00* (2006.01)
   (Continued)

(52) U.S. Cl.
   CPC ...... *G06F 17/3005* (2013.01); *G06F 17/2785* (2013.01); *G06F 17/30029* (2013.01);
   (Continued)

(58) Field of Classification Search
   USPC .................................. 707/728, 748
   See application file for complete search history.

(56) References Cited

U.S. PATENT DOCUMENTS

| 8,140,544 B2 | 3/2012 | Barton et al. |
| 8,818,175 B2 | 8/2014 | Dubin et al. |
| (Continued) | | |

FOREIGN PATENT DOCUMENTS

WO   2013181633 A1   12/2013

OTHER PUBLICATIONS

"Natural Language Processing," [online] Wikipedia, the free encyclopedia, Modified Feb. 16, 2015, retrieved from the Internet: <http://en.wikipedia.org/wiki/Natural_language_processing>, 11 pg.

(Continued)

*Primary Examiner* — Hanh Thai
(74) *Attorney, Agent, or Firm* — Cuenot, Forsythe & Kim, LLC (57) ABSTRACT

Multimedia content is presented to a user. Questions presented by the user are monitored. A core concept of the question can be identified. The multimedia content can be analyzed to determine whether the multimedia content contains a possible answer to the question. If the multimedia content contains a possible answer to the question, but the possible answer is covered in a plurality of segments of the multimedia content, a confidence score can be assigned to each of the plurality of segments that cover the possible answer. The confidence score can indicate a probability that the respective segment answers the question. Based on the confidence score assigned to each of the segments, a segment for which there is a high level of confidence that the segment answers the question can be selected. Based on the (Continued)

selected segment, an answer to the question can be automatically generated and presented to the user.

7 Claims, 5 Drawing Sheets

(51) Int. Cl.
    *G06F 17/27*           (2006.01)
    *H04L 29/06*          (2006.01)
    *H04L 29/08*          (2006.01)

(52) U.S. Cl.
    CPC .. *G06F 17/30595* (2013.01); *G06F 17/30684* (2013.01); *G06F 17/30687* (2013.01); *G09B 7/00* (2013.01); *H04L 65/403* (2013.01); *H04L 67/02* (2013.01)

(56) References Cited

U.S. PATENT DOCUMENTS

| | | | |
|---|---|---|---|
| 9,508,104 B2 * | 11/2016 | Pal | G06Q 50/01 |
| 2005/0198139 A1 | 9/2005 | Malkin et al. | |
| 2006/0020500 A1 * | 1/2006 | Turner | G06Q 10/06312 |
| | | | 705/7.26 |
| 2006/0277165 A1 * | 12/2006 | Yoshimura | G06F 17/30684 |
| 2007/0160969 A1 * | 7/2007 | Barton | G09B 7/00 |
| | | | 434/323 |
| 2007/0218448 A1 * | 9/2007 | Harmeyer | G09B 5/00 |
| | | | 434/350 |
| 2008/0259155 A1 | 10/2008 | McLelland et al. | |
| 2009/0307038 A1 * | 12/2009 | Chakra | G06Q 10/109 |
| | | | 705/7.18 |
| 2012/0151333 A1 * | 6/2012 | Bocking | G06Q 10/109 |
| | | | 715/255 |
| 2013/0288212 A1 * | 10/2013 | Bist | G09B 19/00 |
| | | | 434/236 |
| 2013/0330703 A1 * | 12/2013 | Chivukula | G09B 7/00 |
| | | | 434/322 |
| 2014/0013230 A1 | 1/2014 | Malone | |
| 2014/0052696 A1 * | 2/2014 | Soroushian | H04N 21/4665 |
| | | | 707/691 |
| 2014/0164304 A1 * | 6/2014 | Bagchi | G06N 5/02 |
| | | | 706/46 |
| 2014/0280955 A1 * | 9/2014 | Stuntebeck | H04L 63/107 |
| | | | 709/226 |
| 2016/0127360 A1 * | 5/2016 | Ball | H04L 63/0861 |
| | | | 726/7 |
| 2016/0171119 A1 * | 6/2016 | Bufe | H04L 67/36 |
| | | | 715/746 |

OTHER PUBLICATIONS

IBM: List of IBM Patents or Patent Applications Treated as Related, 2 pg.

Cunico, H. et al., "Electronic Meeting Question Management," U.S. Appl. No. 14/623,855, filed Feb. 17, 2015, 34 pages.

* cited by examiner

```
Based on the selected at least one of the
plurality of segments of the multimedia
content and/or extended content,
automatically generate an answer to the
question presented by the user by
aggregating information contained in
the segment(s)
402
```
↓
```
Communicate the presented question
and the automatically generated answer
to a subject matter expert for validation
of the answer
404
```
↓
```
Responsive to the subject matter expert
validating the generated answer, present
the answer to the user who presented
the question
406
```
↓
```
Store the question and the answer to a
question and answer index
408
```

```
Based on the selected at least one of the
plurality of segments of the multimedia
content and/or extended content,
automatically generating an answer to
the question by selecting at least one
segment that answers the question
presented by the user
502
```
↓
```
Present to the user the selected
segment(s) or an indication of where the
selected segment(s) is/are located in the
multimedia content and/or extended
content
504
```
↓
```
Store the question and the answer to a
question and answer index
506
```

```
Responsive to an answer not being
found in the multimedia content and/or
extended content, provide a
corresponding response to the user who
presented the question
602
```

FIG. 6

FIG. 7

ELECTRONIC MEETING QUESTION MANAGEMENT

BACKGROUND

Arrangements described herein relate to managing questions presented during a meeting.

An example of a meeting is an electronic meeting, such as a web conference. The use of web conferencing has grown significantly over the last decade, facilitated by the proliferation of communication networks, such as the Internet and mobile communication networks, and increases in available bandwidth. These services are valuable tools in the present communication age.

Web conferencing is a service that allows conferencing events to be shared with remote locations. In general, the service is made possible by Internet technologies, particularly on TCP/IP connections. Web conferencing allows real-time point-to-point communications as well as multicast communications from one sender to many receivers during a Web conference. Moreover, web conferences can be recorded, and streamed to receivers at some later point in time. Thus, if a person is not able to participate in a web conference, for example due to a scheduling conflict, the user can view the web conference at a later time.

SUMMARY

A method includes presenting multimedia content to at least one user and, during presentation of the multimedia content, monitoring for questions presented by the user. Responsive to detecting a question presented by the user, a core concept of the question can be identified using at least one process selected from a group consisting of natural language processing (NLP) and semantic analysis to process the question. Responsive to identifying the core concept of the question, the multimedia content can be analyzed to determine, based on the core concept of the question, whether the multimedia content contains at least one possible answer to the question. Responsive to determining that the multimedia content contains at least one possible answer to the question, but that the at least one possible answer is covered in a plurality of segments of the multimedia content, a confidence score can be assigned, using a processor, to each of the plurality of segments of the multimedia content that cover the at least one possible answer. The confidence score assigned to each of the plurality of segments of the multimedia content can indicate a probability that the respective segment of the multimedia content answers the question presented by the user. Based on the confidence score assigned to each of the plurality of segments of the multimedia content, at least one of the plurality of segments of the multimedia content for which there is a high level of confidence that the segment of the multimedia content answers the question presented by the user can be selected. Based on the selected at least one of the plurality of segments of the multimedia content, an answer to the question presented by the user can be automatically generated and presented to the user.

DETAILED DESCRIPTION

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to managing questions presented during a meeting. Several definitions that apply throughout this document will now be presented.

As defined herein, the term multimedia content means content including audio, video, images and/or text that is configured to be communicated electronically via one or more suitable communication busses, networks and/or other electronic circuitry.

As defined herein, the term extended content means multimedia content that supplements other multimedia content presented during a presentation. The extended content may or may not be presented during the presentation, but may be processed to answer questions related to the presentation.

As defined herein, the term concept means a generalization of at least one subject discussed during a presentation. The subject may be discussed using audio, video, one or more images and/or text. For example, if a subject discussed pertains to an equation that determines an anticipated use of system resources, one concept for that subject may be "determined use of system resources" and another concept for that subject may be "equation."

As defined herein, the term "segment" means one of the parts into which something can be divided. For example, multimedia content can be divided into a plurality of segments. Similarly, extended content can be divided into a plurality of segments.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 1:
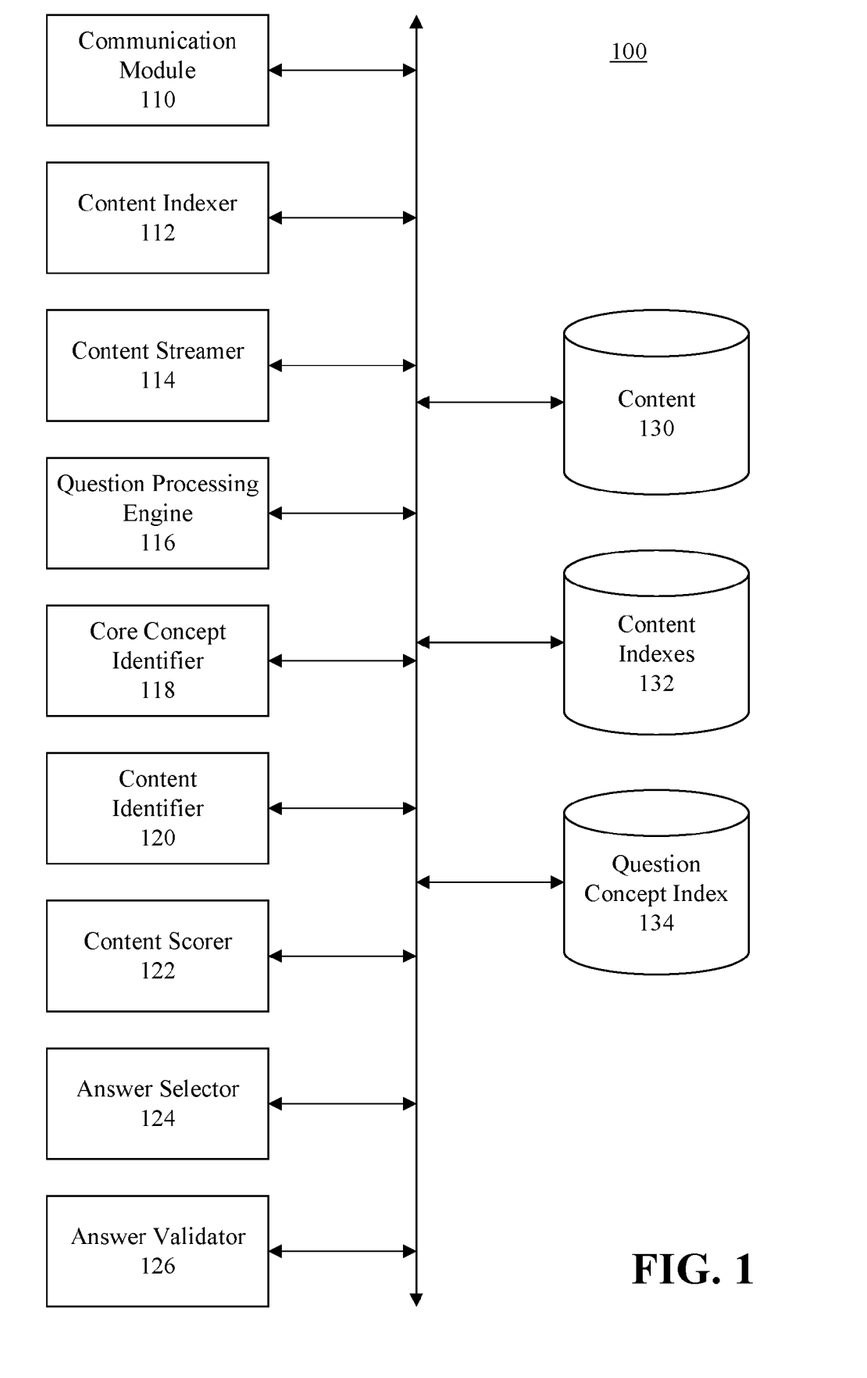
FIG. 1 is a block diagram illustrating an example of an electronic meeting question management system.

FIG. 1 is a block diagram illustrating an example of an electronic meeting question management system (hereinafter "system") 100. The system 100 can include a communication module 110, a content indexer 112, a content streamer 114, a question processing engine 116, core concept identifier 118, content identifier 120, content scorer 122, answer selector 124 and answer validator 126, which can be implemented by computer readable program instructions, for example as computer program modules, configured to be executed by a processor. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified for the respective components 110-126.

The system further can include data structures for storing content 130, a content index 132 and a question concept index 134. These data structures 130-134 can be defined in a suitable computer readable storage medium, and accessed by the components 110-126, when appropriate, to store, update and retrieve data processed and streamed by the system 100. In illustration, the communication module 110 can receive content 130 and store the content 130 in one or more files in the computer readable storage medium. The system 100 can categorize the content 130 using one or more data tables, for example data tables in a database or other suitable data structures. The content index 132 and question concept index 134 also can be stored to one or more data tables or other suitable data structures. The system components 110-126 can be configured to, when executed by a processor, store and access the content 130 and indexes 132-134 via a system bus, a network, and/or other suitable circuitry. Examples of a suitable network include, but are not limited to, the Internet, a local area network (LAN), a wide area network (WAN), a wireless network, a mobile network, a Virtual Private Network (VPN), the Internet, the Public Switched Telephone Network (PSTN), or the like.

Figure 2:
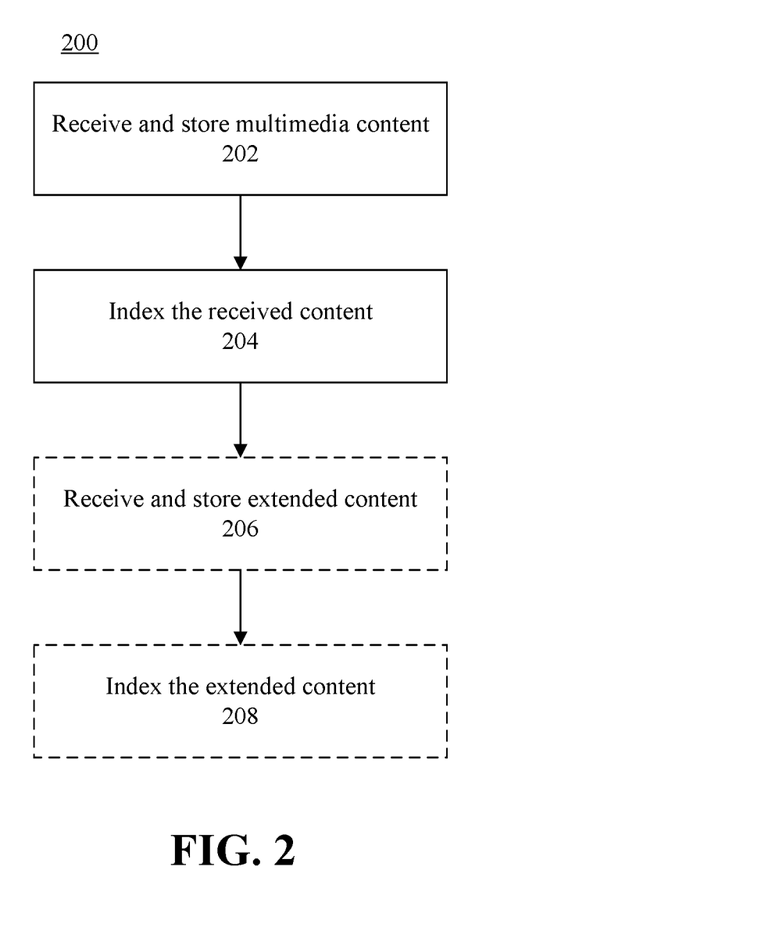
FIG. 2 is a flow chart illustrating an example of storing and indexing content for a multimedia presentation

FIG. 2 is a flow chart illustrating an example of a method 200 of storing and indexing content for a multimedia presentation. Referring both to FIG. 1 and FIG. 2, at step 202 the system 100 can receive multimedia content, for example via the communication module 110. The multimedia content can be stored by the system 100, for example by the content indexer 112, as content 130. The multimedia content can be a multimedia presentation configured to be presented to a plurality of users, and can include audio, video, text and/or images. The multimedia content can be pre-recorded or presented live during a presentation. In one arrangement, the multimedia content can be compressed to optimize use of storage space and network resources used to receive, store and/or stream the multimedia content. For example the multimedia content can be compressed in accordance with a Moving Picture Experts Group (MPEG) format, though the present arrangements are not limited in this regard.

In one example, pre-recorded multimedia content can be uploaded to the system 100, via a suitable network, by the presenter, an administrator or another authorized user. In this regard, a suitable user interface (not shown) can be presented by, or communicatively linked to, the system 100. The user interface can include a control panel with which a user interacts to initiate the upload of the multimedia content. Users can access the multimedia content from the content 130, via a suitable network, when the users desire to listen to and/or view the multimedia presentation. The users can access the multimedia content using suitable multimedia presentation devices. Examples of such multimedia presentation devices include, but are not limited to, televisions, set top boxes, computers, desktop computers, workstations, tablet computers, smart phones, and the like.

In another arrangement, the multimedia content can be presented to a live audience in a meeting space (e.g., auditorium, conference room, etc.) via an audience presentation system and/or streamed live to individual users via individual multimedia presentation devices. As the presenter performs the live presentation, the live presentation can be captured as multimedia content and communicated to the system 100 in real time, for example via a suitable network. The multimedia content can include not only audio/video taken of the presenter, but also videos, images, text, etc. presented by the user during the live presentation. The content indexer 112 can receive, via the communication module 110, the multimedia content and store the received multimedia content as content 130. Any suitable devices known in the art can be used to record the live presentation. Such devices include still and/or motion video capture devices (e.g., cameras), microphones, computers or other devices that capture content presented on a display, etc.

At step 204, the content indexer 112 can create an index of the received multimedia content and store the index as a content index 132. The content index 132 can identify a plurality of segments of the multimedia content, and one or more respective concepts (or subjects) to which each of the plurality of segments pertains. The content index 132 can distinguish different segments of the multimedia content from one another by analyzing the multimedia content. In illustration, the content index 132 can perform speech recognition, natural language processing (NLP) and semantic analysis to identify different segments of the multimedia content and create associations between the different segments and the concepts discussed in the different segments. The speech recognition, NLP and semantic analysis can be applied not only to audio/video taken of the presenter and videos, images, text, etc. presented by the presenter, but also to audio/video of other people, such as participants in the presentation and/or audience members, and other videos, images, text, etc. presented by such other people.

NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input.

Using speech recognition, NLP and semantic analysis, the content indexer 112 can determine when and/or where in the multimedia content a specific concept is discussed, and identify that segment of the multimedia content. The content indexer 112 can create and store, in the content index 132, an association between that segment of the multimedia content and the concept. For instance, the content indexer 112 can create one or more identifiers that identify the segment of the multimedia content and create at least one identifier indicating the at least one concept, and store these identifiers to a record in a data table. Moreover, in the case that the segment of multimedia addresses multiple concepts, the content indexer 112 can create identifiers that identify each of the concepts. In one arrangement, each identifier can represent a particular category. Accordingly, the content indexer 112 can assign each segment to one or more categories. If a category to which the segment is to be assigned does not already exist, the content indexer 112 can create the category.

In one arrangement, the identifiers that identify the segment of the multimedia content can include a begin marker and end marker. The begin marker can identify a specific time or frame in the multimedia content when the particular segment begins and the end marker can identify a specific time or frame in the multimedia content when the particular segment ends. The identifiers that identify the segment of the multimedia content also can include, for example, a sequence identifier that distinguishes that particular segment from other segments of the multimedia content. In addition to creating an association between the segment of the multimedia content and the concept(s) discussed therein, the content indexer 112 also can and store create an association between the segment and related topics, pre-existing questions and/or known questions.

Optionally, at step 206, the system 100 also can receive extended content. The extended content also can be stored by the system 100, for example by the content indexer 112, as content 130. In illustration, the presenter, an administrator or another authorized user can upload to the system 100 the extended content, for example as previously described. The extended content can include anticipated questions pertaining to the multimedia content, answers to the anticipated questions and/or extended explanations of concepts discussed in the multimedia content. The extended content can include audio, video, text and/or images. The presenter can create the extended content before or after creating a multimedia presentation.

At step 208, the content indexer 112 can create an index of the received extended content and store the index as a content index 132. Again, the content indexer 112 can perform speech recognition, NLP and semantic analysis to identify different segments of the extended content and create associations between the different segments and the concepts discussed in the different segments, for example as previously described with respect to creating associations between segments of the multimedia content and respective concepts. The index created for the extended content also can include associations between the different segments of the extended content and segments of the multimedia content to which the extended content pertains. For example, if a particular segment of the extended content includes a question, answer and/or extended explanation that pertains to a concept discussed in a particular segment of the multimedia content, the content index 132 for the extended content can create a link between those segments. In illustration, an identifier indicating the particular segment of the multimedia content can be stored to a data record corresponding to the question, answer and/or extended explanation. Moreover, an identifier indicating the particular question, answer and/or extended explanation also can be added to the content index of the particular segment of the multimedia content to which the question, answer and/or extended explanation pertains.

Figure 3:
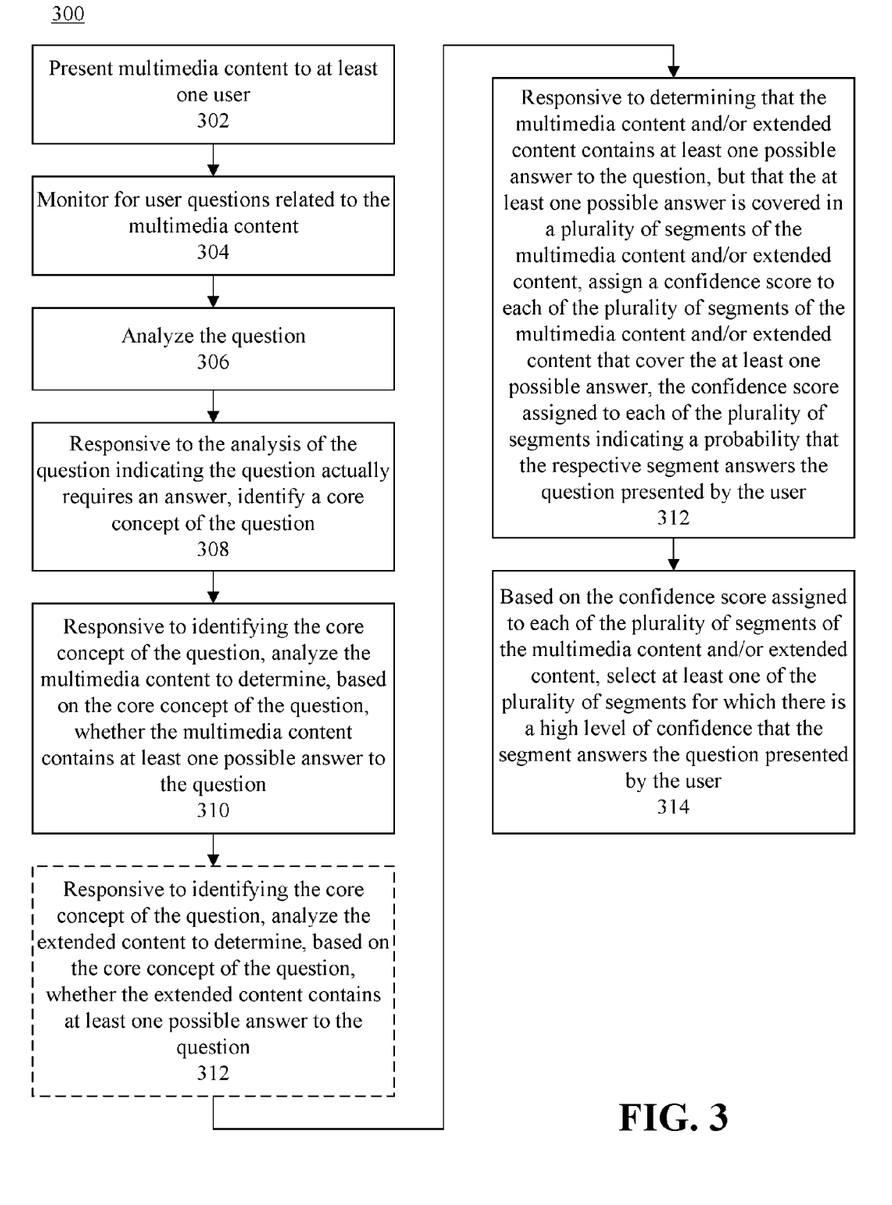
FIG. 3 is a flow chart illustrating an example of a method of selecting one or more segments of multimedia content and/or extended content which may contain an answer to a question presented by a user.

FIG. 3 is a flow chart illustrating an example of a method 300 of selecting one or more segments of multimedia content and/or extended content which may contain an answer to a question presented by a user. Referring to FIGS. 1 and 3, at step 302 of FIG. 3, the system 100 can present the multimedia content to one or more users. For example, the content streamer 114 can access the multimedia content from the content 130 and stream, via the communication module 110 and over one or more suitable networks, the multimedia content to one or more users, for instance to the user's multimedia presentation devices.

At step 304, the system 100 can monitor for user questions related to the multimedia content. For example, one or more microphones can be configured to detect spoken utterances generated by the user(s) and communicate the spoken utterances to the system 100, for example via the communication module 110. In one arrangement, the microphone(s) can be included as components of the user multimedia presentation device(s), operatively connected to the user multimedia presentation device(s). In this regard, the user multimedia presentation device(s) can be configured to establish a bi-directional communication session with the system 100 in which the multimedia content is streamed to the multimedia presentation device(s) from the system 100 and detected audio is streamed from the multimedia presentation device(s) to the system 100. In another arrangement, one or more microphones can be communicatively linked to the system 100, for example via one or more networks and suitable network infrastructure, and placed in proximity of users to whom the multimedia presentation is being presented.

In another example, users can type their questions using their respective multimedia presentation device(s) or other devices communicatively linked to the system 100. For instance, users can type their questions into a user interface presented by the system 100, for example in a web page, or users can enter their questions into a text document and communicate the text document to the system 100. Such documents can be communicated to the system 100 by uploading the documents to the system 100 or e-mailing the documents to the system, for example as an attachment to an e-mail. Users also can enter their questions into a body of an e-mail or text message and send the e-mail or text message to the system 100. For example, users can send the e-mails to an e-mail address assigned to the system 100, or send the text messages to an identifier or telephone number assigned to the system 100. The communication module 110 can be configured to handle all such communications.

At step 306, for each question that is received, the question can be analyzed by the system 100. For example, the question processing engine 116 can analyze the question to determine whether the question actually requires an answer. In illustration, some questions may not really be questions, but comments. The question processing engine 116 can use speech processing, NLP and/or semantic analysis to analyze the question, and based on the analysis, determine whether the question actually requires an answer. Based on this analysis, the question processing engine 116 also can categorize the question into at least one of a plurality of categories. Examples of various categories include, but are not limited to, general question, technical question, general comment, technical comment, unanswerable question, and the like.

At step 308, responsive to the question being presented by the user and the analysis of the question indicating the question actually requires an answer, the system 100 can identify a core concept of the question. For example, the core concept identifier 118 can process results of the analysis performed on the question to identify the core concept of the question. For example, if a question asks "how is the equation derived?", the concept identifier can identify the core concept as "equation." The core concept identifier 118 can store the core concept identified for the question into the question concept index 134. Further, the core concept identifier 118 also can store the question into the question concept index 134 in a manner that associates the question with the identified core concept.

At step 310, responsive to identifying the core concept of the question, the system 100 can analyze the multimedia content to determine, based on the core concept of the question, whether the multimedia content contains at least one possible answer to the question. For example, the content identifier 120 can access the core concept of the question from the question concept index 134 and query the content index 132 for the multimedia content to determine whether there are any identifiers contained in the content index 132 that indicate at least one concept that corresponds to the core concept of the question. Such an identifier can correspond to the core concept of the question if the identifier matches the core concept, and can be identified by the content identifier. In some cases, however, the identifier may not precisely match the core concept of the question, but may somehow correspond to the core concept. For instance, an identifier may be a synonym of the core concept, or some other term related to the core concept. Moreover, the core concept may contain a word or phrase that is a colloquialism not specifically used in the multimedia content. Nonetheless, the content identifier 115 can implement NLP and semantic analysis on the identifiers contained in the content index 132 to identify the identifiers that are related to the core concept of the question.

Based on the identifiers that are identified in the content index 132, the content identifier 120 can determine that the corresponding segments of the multimedia content and/or extended content may contain at least one possible answer to the question. The content identifier 120 can access those segments of the multimedia content, for example from the content 130, for further analysis by the content scorer 122. The content identifier 120 can access the segments of the multimedia content, for example, using the previously described begin and end markers stored in the content index 132, the previously described sequence marker, or in another suitable manner. The content identifier 120 can apply NLP and semantic analysis to the accessed segments of the multimedia content to determine whether the any of the accessed segments potentially contains at least one possible answer to the question. If so, the content identifier 120 can select those segments that potentially contain at least one possible answer to the question.

Optionally, at step 312, responsive to identifying the core concept of the question, the system 100 can analyze the extended content to determine, based on the core concept of the question, whether the extended content contains at least one possible answer to the question. For example, the content identifier 120 can access the core concept of the question from the question concept index 134 and query the content index 132 for the extended content to determine whether there any identifiers contained in the content index 132 that indicate at least one concept that corresponds to the core concept of the question. The content identifier 120 can identify and access any segments of the extended content corresponding to the identifiers contained in the content index 132 that indicate at least one concept that corresponds to the core concept of the question, for example as previously described with respect to accessing the multimedia content segments. Again, the content identifier can apply NLP and semantic analysis to the accessed segments of the extended content to determine whether any of the accessed segments potentially contains at least one possible answer to the question. If so, the content identifier 120 can select those segments that potentially contain at least one possible answer to the question.

At step 314, responsive to determining that the multimedia content and/or extended content contains at least one possible answer to the question, but that the at least one possible answer is covered in a plurality of segments of the multimedia content and/or extended content, the system 100 can assign a confidence score to each of the plurality of segments of the multimedia content and/or extended content that cover the at least one possible answer. The confidence score assigned to each of the plurality of multimedia content and/or extended content segments can indicate a probability that the respective segment answers the question presented by the user. For example, the content scorer 122 can apply NLP and semantic analysis to the segments selected by the content identifier 120 to assign the confidence score. In another arrangement, the content identifier 120 can assign the confidence score when performing the NLP and semantic analysis to determine whether any of the accessed segments potentially contains at least one possible answer to the question. The confidence score assigned to each segment can be based, at least in part, on the category to which the question is categorized. For example, if the segment addresses a subject which corresponds to the category to which the question is assigned, or is assigned the same category as the question, the confidence score assigned to the segment can be higher than the confidence score would be if the segment did not correspond to the category.

The confidence level assigned to each segment can depend on multiple factors. One example of such a factor is the category to which the question is assigned. Another factor is the category to which the segment is assigned. Results obtained from performing contextual semantic analysis on the segment provide another factor. Contextual semantic analysis provides a computer-based understanding of the question in the context of information being presented in the segment. A low score on analyzing the information presented in the segment and a low score on analyzing the question can render in low confidence score. Conversely, a high score on analyzing the information presented in the segment and high score on analyzing the question can render a high confidence score.

In one arrangement, if only one segment is identified as containing at least one possible answer to the question, a confidence score need not be applied to that segment, or a default confidence score can be assigned to the segment. In another arrangement, even if only one segment is identified as containing at least one possible answer to the question, a confidence score still can be assigned to that segment.

If a plurality of segments have been selected and scored, based on the confidence score assigned to each of the plurality of segments of the multimedia content and/or extended content, the answer selector 124 can select at least one of the plurality of segments for which there is a high level of confidence that the segment answers the question presented by the user. In another arrangement, the answer selector 124 can select a particular number of the segments having the highest score. For example, the answer selector 124 can select one, two or three segments having the highest confidence scores.

Figure 4:
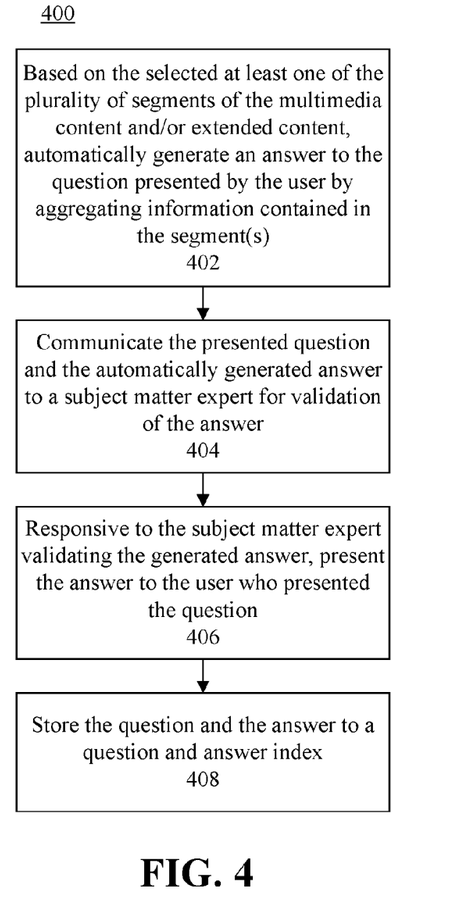
FIG. 4 is a flow chart illustrating an example of a method of presenting an answer to a question presented by a user.

FIG. 4 is a flow chart illustrating an example of a method 400 of presenting an answer to a question presented by a user. Referring to FIGS. 1 and 4, at step 402, based on the selected segments of the multimedia content and/or extended content, the answer selector 124 can automatically generate an answer to the question by aggregating information contained in the segment(s). For example, the answer selector 124 can, based on the NLP and semantic analysis applied to the segments by the content identifier 120, or based on a new NLP and semantic analysis applied by the answer selector 124, identify information contained in the selected segments applicable to the question. The answer selector 124 can process and aggregate such information to formulate an answer. In some instances, the complete answer may not be contained in a single segment of the media content and/or extended content. Instead, parts of the answer may be contained in multiple ones of the selected segments. The answer selector 124 can obtain portions of the answer from the selected segments, and aggregate those portions to formulate an answer from the selected segments using NLP and semantic analysis.

At step 404, the communication module 110 can communicate the presented question and the automatically generated answer to a subject matter expert for validation. For example, the communication module 110 can communicate the automatically generated answer to the presenter of the presentation or another person who is an expert in subject matter covered by the presentation. In this regard, contact information, for example an e-mail address, messaging user identifier, etc., for the presenter or other subject matter expert can be associated with the presentation. Such information can be provided to the system 100 when the multimedia content is uploaded to the system 100 or, if the presentation is presented live, when the system 100 is configured to receive a stream of the multimedia content. In one aspect, the information can be included as metadata attached to the multimedia content. Further, the subject matter expert can edit the automatically generated answer, and communicate the edited version of the answer back to the system 100, which can serve as a validation of the answer. If, however, the subject matter expert is satisfied with the automatically generated answer, the subject matter expert can communicate to the system 100 a response indicating that the automatically generated answer is satisfactory, which also can serve as a validation of the answer.

In another arrangement, the question and automatically generated answer can be communicated to the subject matter expert via a website. For example, the subject matter expert can log into a website hosted by the system 100, or hosted on behalf of the system 100, to view the question and automatically generated answer. Via a user interface of the website, the subject matter expert can edit the automatically generated answer if he/she so chooses. When the subject matter expert is satisfied with the automatically generated answer, or a revised version of the answer, the subject matter expert can select a control presented in the user interface to indicate that the answer is satisfactory, thereby validating the answer.

At step 406, responsive to the subject matter expert validating the generated answer, the system 100 can present the answer to the user who presented the question. For example, the system 100, via the communication module 110 and/or content streamer 114, can post the user question and the answer to the question in a comments portion of the presentation. Further, via the communication module 110, the system 100 can electronically communicate the question and answer to the user, as text via e-mail or text messaging, present the question and answer on a website accessed by the user, etc. In the case that the user is still viewing the multimedia content, the system 100 can present the question and answer on the user's multimedia presentation device. For example, the content streamer 114 can pause presentation of the multimedia content to present, via the communication module 110, the answer. The answer can be presented visually, for example via text and/or one or more images, or presented audibly using speech synthesis. In an arrangement in which the answer is presented visually, for example via text, the content streamer 114 and/or communication module 110 also can present the question and answer below, above, or beside the multimedia content while the multimedia content continues to be streamed, or present the questions and answer in any other suitable manner.

At step 408, responsive to the subject matter expert validating the generated answer, the system 100 can store the question presented by the user and the automatically generated answer, or the edited answer, to the question in an answer index in the content indexes 132. For example, the answer validator 126 can store the question and answer in the answer index. In one arrangement, the question and answer index can be included in the extended content for the presentation. Thus, if other users ask the same or a similar question, the automatically generated question, or an edited version of the automatically generated question, can be presented to such other users. Further, the system can notify the presenter of the question and the answer to the question, thereby making them available as feedback to the presenter. For example, the presenter can access the answer and question from the question index in the extended content.

Figure 5:
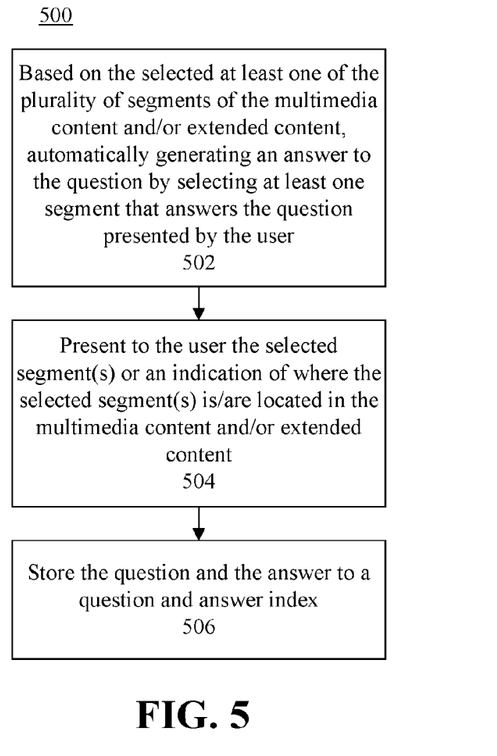
FIG. 5 is a flow chart illustrating another example of a method of presenting an answer to a question presented by a user.

FIG. 5 is a flow chart illustrating another example of a method 500 of presenting an answer to a question presented by a user. Referring to FIGS. 1 and 5, at step 502, based on the selected segments of the multimedia content and/or extended content, the answer selector 124 can automatically generate an answer to the question by selecting at least one segment that answers the question presented by the user. For example, based on the NLP and semantic analysis and the confidence score applied to the segments, the answer selector 124 can determine whether one or more of the segments answer the question. If so, the answer selector 124 can select such segment(s).

At step 504, the system 100, via the communication module 110, can present the selected segment(s) to the user or provide to the user an indication of where the selected segment(s) is/are located in the multimedia content and/or extended content. For example, the system 100, via the communication module 110 and/or content streamer 114, can posts the user question and the indication of where the selected segment(s) that answer the question is/are located in a comments portion of the presentation. Further, via the communication module 110, the content streamer 114 can pause presentation of the multimedia content to present, via the communication module 110, the selected segment(s) to the user. In another arrangement, the communication module 110 can provide to the user an indication of where the selected segment(s) is/are located in the multimedia content and/or extended content. The content streamer 114/communication module 110 also can present the selected segment(s) to the user, or provide to the user the indication of where the selected segment(s) is/are located, below, above, or beside the multimedia content while the content streamer continues to stream the multimedia content to the user, or present such information in any other suitable manner. The indication of where in the multimedia content and/or extended content the answer is located can include a begin marker and an end marker, such as those previously discussed, an identifier for a slide or document page presented during the presentation, or the like. For example, the indication can include a begin time or begin frame and an end time or end frame for the segment(s) containing the answer. In the case of extended content that is provided as text, the communication module 110 can communicate the text to the user.

In another arrangement, rather than interrupt streaming of the multimedia content, the communication module 110 can indicate the to the user the indication of where the selected segment(s) is/are located in the multimedia content and/or extended content via e-mail, text messaging, a message posted to the user on the website, or communicate the indication in any other suitable manner. Further, the communication module 110 can provide to the user a hyperlink to access the selected segment(s) of the multimedia content and/or extended content.

At step 506, the system 100 can store the question presented by the user and the automatically generated answer to the question in an answer index in the content indexes 132. For example, the answer validator 126 can store the question and the location(s) in the multimedia content and/or extended content where the question is answered. Again, the system 100 can notify the presenter of the question and the answer to the question, thereby making them available as feedback to the presenter. For example, the presenter can access the answer and question from the question index in the extended content.

Figure 6:
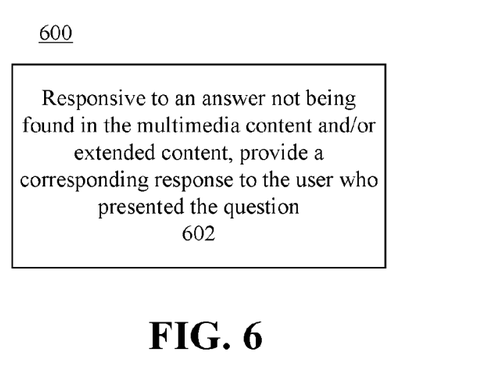
FIG. 6 is a flow chart illustrating another example of a method of presenting an answer to a question presented by a user.

FIG. 6 is a flow chart illustrating another example of a method 600 of presenting an answer to a question presented by a user. For some questions, there may not be an answer contained in the multimedia content or the extended content, or the confidence scores assigned to the selected segments may be low. For example, a question presented may be a rhetorical question, a question that is off topic, or a comment. In such cases, at step 602, responsive to an answer not being found in the multimedia content and/or extended content, the system 100, via the communication module 110, can provide to the user who presented the question a corresponding response. The response can be a generic response, a response indicating the question is off topic, or the like. In another facet of the present arrangements, such questions can be communicated to a subject matter expert, for example the presenter of the multimedia content or some other person familiar with the presentation subject, for further analysis. The subject matter expert, at his/her option, may respond directly to the user presenting the question.

Figure 7:
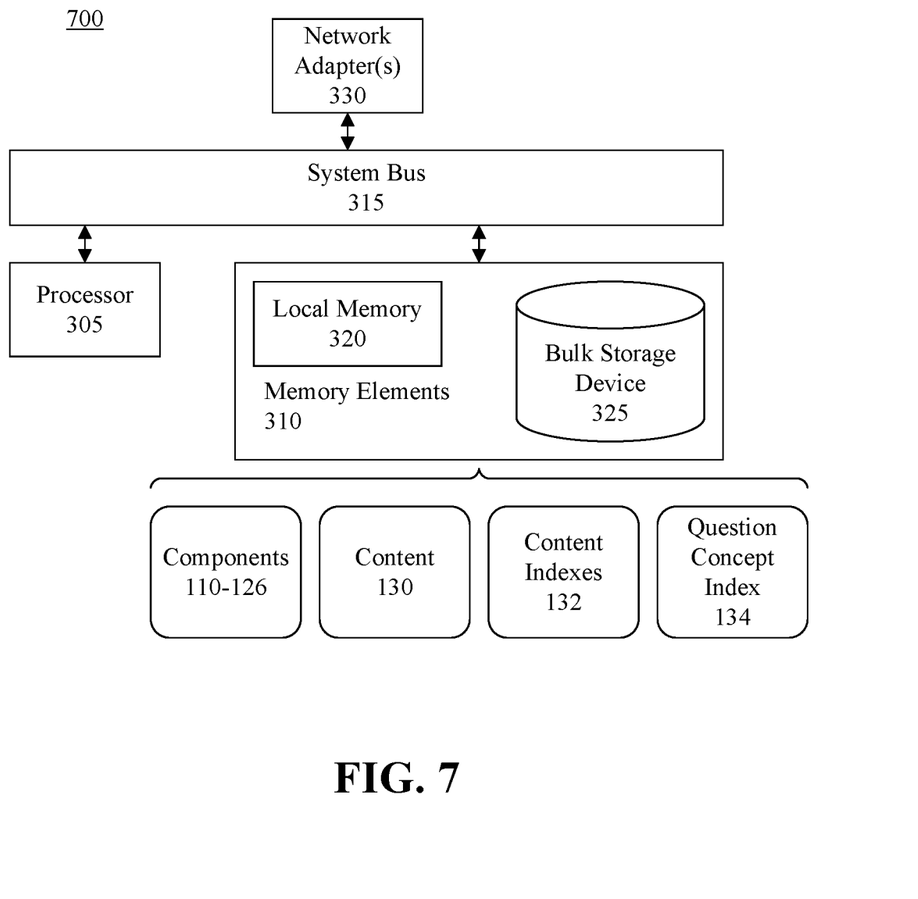
FIG. 7 is a block diagram illustrating example architecture for a data processing system.

FIG. 7 is a block diagram illustrating example architecture for a data processing system 700 configured to manage electronic meeting questions in accordance with an arrangement disclosed within this specification. The data processing system 700 can include at least one processor 705 (e.g., a central processing unit) coupled to memory elements 710 through a system bus 715 or other suitable circuitry. As such, the data processing system 700 can store program code within the memory elements 710. The processor 705 can execute the program code accessed from the memory elements 710 via the system bus 715. It should be appreciated that the data processing system 700 can be implemented in the form of any system including a processor and memory that is capable of performing the functions and/or operations described within this specification. For example, the data processing system 700 can be implemented as a computer, a workstation, a mobile computer, a laptop computer, a tablet computer, a smart phone, a personal digital assistant, a gaming device, an appliance, and so on.

The memory elements 710 can include one or more physical memory devices such as, for example, local memory 720 and one or more bulk storage devices 725. Local memory 720 refers to random access memory (RAM) or other non-persistent memory device(s) generally used during actual execution of the program code. The bulk storage device(s) 725 can be implemented as a hard disk drive (HDD), solid state drive (SSD), or other persistent data storage device. The data processing system 700 also can include one or more cache memories (not shown) that provide temporary storage of at least some program code in order to reduce the number of times program code must be retrieved from the bulk storage device 725 during execution.

Input/output (I/O) devices such as a one or more network adapters 745 also can be coupled to data processing system 700 to enable the data processing system 700 to become coupled to other systems, computer systems, client devices (e.g., multimedia presentation devices) and/or remote storage devices through intervening private or public networks via a network. Modems, cable modems, transceivers, and Ethernet cards are examples of different types of network adapters 730 that can be used with the data processing system 700.

As pictured in FIG. 7, the memory elements 710 can store the components of the system 100 of FIG. 1, namely the components 110-126, the content 130, content indexes 132 and question concept index 134. Being implemented in the form of executable program code, the components 110-126 can be executed by the data processing system 700 and, as such, can be considered part of the data processing system 700. The content 130, content indexes 132 and question concept index 134, being stored and accessed by the data processing system 700, also can be considered part of the data processing system 700. Moreover, components 110-126, the content 130, content indexes 132 and question concept index 134 are functional data structures that impart functionality when employed as part of the data processing system 700 of FIG. 7.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    presenting multimedia content to at least one user and, during presentation of the multimedia content, monitoring for questions presented by the user;
    responsive to detecting a question presented by the user, identifying a core concept of the question using at least one process selected from a group consisting of natural language processing (NLP) and semantic analysis to process the question;
    responsive to identifying the core concept of the question, analyzing the multimedia content to determine, based on the core concept of the question, whether the multimedia content contains at least one possible answer to the question;
    responsive to determining that the multimedia content contains at least one possible answer to the question, but that the at least one possible answer is covered in a plurality of segments of the multimedia content, assigning, using a processor, a confidence score to each of the plurality of segments of the multimedia content that cover the at least one possible answer, the confidence score assigned to each of the plurality of segments of the multimedia content indicating a probability that the respective segment of the multimedia content answers the question presented by the user;
    based on the confidence score assigned to each of the plurality of segments of the multimedia content, selecting at least one of the plurality of segments of the multimedia content for which there is a high level of confidence that the segment of the multimedia content answers the question presented by the user; and
    based on the selected at least one of the plurality of segments of the multimedia content, automatically generating an answer to the question presented by the user and presenting the automatically generated answer to the user.

2. The method of claim 1, wherein:
analyzing the multimedia content to determine, based on the core concept of the question, whether the multimedia content contains at least one possible answer to the question comprises:
    categorizing the question into at least one of a plurality of question categories based on the identified core concept of the question; and
assigning the confidence score to each of the plurality of segments of the multimedia content comprises:
    assigning the confidence score based, at least in part, on the categorizing the question into at least one of the plurality of question categories.

3. The method of claim 1, wherein automatically generating the answer to the question presented by the user comprises aggregating information contained in the plurality of segments of the multimedia content to formulate the answer.

4. The method of claim 1, wherein automatically generating the answer to the question presented by the user comprises selecting at least one of the plurality of segments that answers the question presented by the user.

5. The method of claim 4, wherein presenting the automatically generated answer to the user comprises presenting to the user the at least one of the plurality of segments that answers the question presented by the user.

6. The method of claim 4, wherein presenting the automatically generated answer to the user comprises indicating to the user where in the multimedia content the at least one of the plurality of segments that answers the question presented by the user is contained.

7. The method of claim 1, further comprising:
    responsive to identifying the core concept of the question, analyzing extended content to determine, based on the core concept of the question, whether the extended content contains at least one possible answer to the question;
    wherein automatically generating the answer to the question presented by the user comprises automatically generating the answer, based at least in part, on the extended content.

* * * * *